United States Patent Office 2,918,371
Patented Dec. 22, 1959

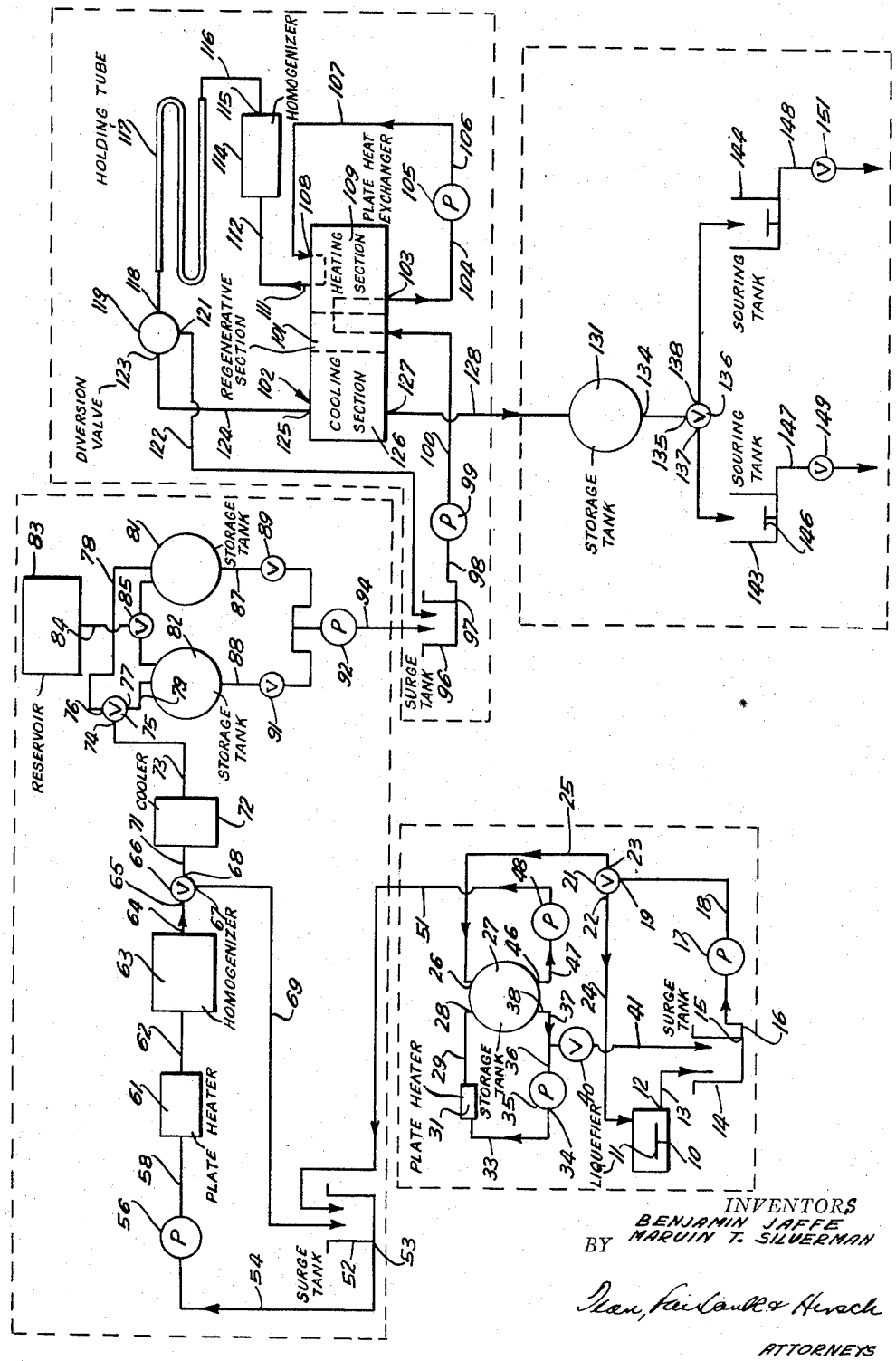
INVENTORS
BENJAMIN JAFFE
MARVIN T. SILVERMAN
BY
ATTORNEYS

2,918,371

PROCESSING OF SOUR CREAM

Benjamin Jaffe, Delhi, and Marvin T. Silverman, Yonkers, N.Y., assignors to Middletown Milk & Cream Co. Inc., Yonkers, N.Y., a corporation of New York Application April 24, 1958, Serial No. 730,556

19 Claims. (Cl. 99—59)

This invention relates to the art of processing sour cream and more particularly to a method and equipment for continuously performing such processing.

As conducive to an understanding of the invention it is noted that where sour cream is made by a batch process, due to limitations in the size of conventional equipment used, each batch is relatively small and to produce any substantial quantity, many batches must be processed.

Where the batch process involves the steps of adding frozen sweet cream to preheated skim milk in a pasteurizer to form a mixture and then heating the mixture to a pasteurization temperature of say 165° F., which must be maintained for approximately one-half hour, the operation is inherently time-consuming, especially where many batches must be successively processed.

Where the batch thus far processed is drawn by suction from the pasteurizer into a homogenizer, due to the possibility of air being drawn into the homogenizer from each batch in the pasteurizer when substantially all of the mixture has been withdrawn from the latter, a small quantity is normally left in the bottom of the pasteurizer to prevent entry of air. However, even with this precaution, some air is often drawn into the homogenizer at the end of each batch, due to the fact that there is insufficient mixture remaining in the pasteurizer, with the result that the final product will be lumpy which is undesirable for commercial use.

In addition, as more or less air may be drawn into the homogenizer with each batch, the resultant product will differ in smoothness, or freedom from lumps, from batch to batch which is undesirable.

After the mixture is homogenized, it must be tested for fat content in order to attain the desired concentration which, say, is in the order of eighteen percent. Where the fat content is higher, which is usually the case, skim milk must be added. As a result, due to the presence of unhomogenized milk, the standardized mixture must again be drawn into a homogenizer for further homogenization with the result that additional air may be drawn into the mixture with the disadvantages about noted.

Since only relatively small quantities can be handled at one time by equipment designed to operate on "batches," in order to produce a relatively large quantity of sour cream in a given period, it is necessary to use a test for fat content that is relatively rapid in action, such as the conventional "Babcock" test which has the disadvantage that it is relatively inaccurate, causing the finished product to differ appreciably in fat content from batch to batch.

Where, in an attempt to utilize "short time" units for pasteurization and homogenization, which greatly speeds up the operation, the frozen sweet cream is heated in a conventional liquefier which has a rotary disc that hurls the melted cream to an outlet, as the cream starts to flow as soon as its temperature is above freezing, and normally would be raised to a temperature of say 85° F. when it is discharged from the liquefier, if a pump is used to force such melted cream into a large storage tank to be mixed with skim milk, due to the reaction of the pump and the temperature of the sweet cream, the latter will tend to be churned into butter so that it would be useless for subsequent processing to form sour cream.

It is accordingly among the objects of the invention to provide a method and equipment for continuously processing sour cream at a relatively high rate of speed, with assurance that the finished product from run to run is of substantially uniform fat content and is substantially devoid of lumps due to air bubbles in the mixture.

According to the invention, these objects are accomplished in the manner hereinafter described and particularly recited in the claims.

In the accompanying drawings, the single figure illustrates a system for performing the method according to the invention.

Referring now to the drawings, a preferred system for performing the method desirably comprises a liquefier 10 of conventional type such as that put out by The Bryant Liquefier Company, which has a rotary disc 11 with a steam jacket that may be filled with low pressure steam. The output 12 of the liquefier 11 is fed through a line 13 into a surge tank 14, the latter having an outlet 15 connected by line 16 to the inlet of a pump 17 illustratively of the positive drive type. The outlet of the pump 17 is connected by line 18 to the inlet port 19 of a three-way valve 21 which has two outlet ports 22 and 23, either or both of which may be connected to the inlet port 19 so that depending upon the setting of the valve, all of the fluid flowing through line 18 may be directed into either line 24 connected to outlet port 22 or line 25 connected to outlet port 23, or desired proportions of the fluid flowing through line 18 may be directed through outlet ports 22 or 23.

The line 24 leads back into liquefier 11 and the line 25 is connected to port 26 of a storage tank 27 which may be of conventional type such as that put out by the Pfaudler Company of Rochester, New York, having an associated agitator (not shown). The storage tank 27 has an additional inlet 28 connected by line 29 to the outlet of a plate heater 31 of conventional type, the inlet of said heater 31 being connected by line 33 to the outlet 34 of a centrifugal pump 35, the inlet 36 of which is connected by line 37 to the outlet 38 of storage tank 27 and also through valve 40 and line 41 to the surge tank 14.

Means are provided to feed fluid from the storage tank 27 to subsequent processing stages.

To this end, the storage tank 27 may have an outlet 46 connected by line 47 to the inlet of a centrifugal pump 48, the outlet of which is connected by line 51 to a surge tank 52. The surge tank 52 has an outlet 53 connected by line 54 to the inlet of a pump 56, the outlet of which is connected by line 58 to the inlet of a conventional plate heater 61, the outlet of which is connected by line 62 to a conventional homogenizer 63. The outlet of the homogenizer is connected by line 64 to the inlet port 65 of a valve 66, which has two outlet ports 67 and 68, either of which may be connected to the inlet port 65.

The port 67 is connected by line 69 to the surge tank 52 and the port 68 is connected by line 71 to the inlet of a cooler 72, the outlet of which is connected by line 73 to the inlet port 74 of a valve 75 which is identical to valve 66, having two outlet ports 76 and 77 either of which may be connected to the inlet port 74.

The ports 76 and 77 are connected respectively by lines 78 and 79 to the inlets of storage tanks 81 and 82 which are similar to the storage tank 27. In addition, a reservoir 83 is provided, the outlet of which is connected through line 84 and valve 85 to the tanks 81 and 82, so that depending upon the position of valve 85, the fluid from tank 83 may be directed into either storage tank 81 or 82.

The outlets of storage tanks 81 and 82 are connected by lines 87 and 88 through associated valves 89 and 91 to the inlet of a pump 92, the outlet of which is connected by line 94 into a surge tank 96.

The surge tank 96 has an outlet 97 connected by line 98 to the inlet of a booster pump 99, the outlet of which is connected by line 100 into the regenerative section 101 of a heating and cooling unit 102 of conventional type such as that put out by the York Corporation of York, Pennsylvania, and designated a York plate heat exchanger.

The outlet 103 of the regenerative section is connected by line 104 to the inlet of a timing pump 105 which controls the exact quantity of fluid which flows through the system. The outlet 106 of the pump 105 is connected by line 107 to the inlet 108 of the heating section 109 of the unit 102 and the outlet 111 of said unit is connected by line 112 to the inlet of a homogenizer 114. The outlet 115 of the homogenizer is connected by line 116 into a holding tube 117, the outlet of which is connected to the inlet port 118 of a solenoid controlled flow diversion valve 119. The valve 119 has an outlet port 121 which is normally connected to the inlet port 118 and said port 121 is connected by line 122 to the surge tank 96. The valve 119 has an additional outlet port 123 which is connected to the inlet port 118 when the fluid flowing through the valve has reached pasteurization temperature, i.e., approximately 165° F. at which time the valve will cut off flow through port 121 and direct the flow through port 123.

The port 123 of valve 119 is connected by line 124 to the inlet 125 of the cooling section 126 of the unit 102 which reduces the temperature of the fluid to approximately 120° to 130° F. The outlet 127 of cooling section 126 is connected by line 128 to the inlet of a storage tank 131 similar to those previously described. The outlet 134 of the storage tank is connected to the inlet port 135 of a valve 136 which has two outlet ports 137 and 138, either of which may be connected to the inlet port 135. The ports 137 and 138 are connected respectively to the inlets of identical souring tanks 143 and 144, said tanks being provided with conventional agitators 146. Each of the tanks has an outlet connected by lines 147, 148 to an associated valve 149, 151 from which the product is discharged for subsequent curing and cooling.

*Operation*

To perform the method of the invention, the storage tank 27 is filled with a predetermined quantity of skim milk, and the pump 35 is energized. As a result, the skim milk in the tank which initially is cold, will be drawn from the outlet 38 of the tank 27 and forced through heater 31 back into the tank 27. As the heater is initially at a temperature of say 160° F. this will cause the temperature of the skim milk to be raised. As a result of the connection of line 41 to line 37, some of the fluid drawn from the storage tank 27 will flow into the surge tank 14. As the pump 17 is energized at this time, the fluid in the surge tank 14 will be drawn therefrom and forced through line 18, valve 21 and line 24 into the liquefier 11, the liquid flowing by gravity from the liquefier through line 13 back into the surge tank 14. The valve 21 is adjusted so that fluid will not overflow from the surge tank 14, a portion of such fluid passing through valve 21 and line 25 back into the storage tank 27.

Thus, the skim milk will flow continuously through the heater 31 back into the storage tank 27 and also through the liquefier 11 and surge tank 14 back into the storage tank.

When the skim milk has reached a temperature of more than, say, 120° F., which may be determined by a suitable temperature gauge (not shown) associated with the storage tank 27, the disc 11 of the liquefier 10 is rotated and heated by application of steam to the jacket thereof.

Based upon the quantity of skim milk in the storage tank 27, a given quantity of sweet cream which illustratively is frozen and has a fat content of fifty percent to conserve space, is slowly fed to the liquefier 11. Since the percentage of fat ultimately required for the finished product is illustratively 18 percent, sufficient sweet cream is added so that when combined with the quantity of skim milk in the storage tank 27, the fat content will be, say, approximately twenty percent. As the frozen sweet cream is placed on the top of the rotating disc of the liquefier and the hot skim milk is poured thereinto through line 24, the resultant blend or mixture flowing through line 13 into the surge tank 14 will have a temperature considerably above 80° F. The mixture in the surge tank 14 is further mixed with the hot skim milk from line 41 and this mixture is forced by pump 17 through the valve 21 so that it will flow both into the storage tank 27, through line 25 and through line 24 into the liquefier 11. As the temperature of the mixture passing through the pump is considerably above 80° F., it will not be churned into butter by the action of pump 17.

The valve 21 is adjusted so that even with the addition of the sweet cream into the system, the surge tank 14 will not overflow and when the temperature of the fluid in the storage tank 27 has reached approximately 120° F., the heater 31 is regulated so that the temperature of the fluid circulating therethrough will not exceed 160° F. which would be deleterious to the fat molecules.

As more and more sweet cream is added to the liquefier, due to the circulating system above described, the mixture in the storage tank 27 will gradually approach the desired twenty percent fat concentration which is based upon the quantity of skim milk originally present in the storage tank 27 and the amount of sweet cream added to the liquefier 11.

With the system thus far described, it is apparent that by having the storage tank 27 of the desired capacity it can be filled with sufficient fluid of the desired twenty percent fat concentration for an entire days run. As the liquefier only has to handle a relatively small quantity of sweet cream and skim milk, it need merely be of conventional relatively small dimensions. If desired, one or more storage tanks 27 can be added to increase the capacity of the system.

When the desired quantity of sweet cream has been introduced into the liquefier and the temperature of the mixture in the storage tank is approximately 120° F., the valve 21 is adjusted so that all of the fluid flowing through line 18 will flow into storage tank 27 and valve 40 controlling flow through line 41 is closed.

When the surge tank 14 is empty, the pump 17 may be stopped and thereupon the mixture in the storage tank 27 will circulate through the heater 31 which maintains the temperature of the mixture at approximately 120° F.

At this time the pump 48 is energized to force the mixture from storage tank 27 through line 51 into the surge tank 52. From the surge tank 52 the mixture is forced by pump 56 through the plate heater 61 which raises the temperature to 158° F., i.e., slightly below pasteurization temperature of, say, 160° F., and through a conventional homogenizer 63 which subjects the mixture to a pressure of say 2,000 p.s.i. The output of the homogenizer 63 initially is bypassed by valve 66 through line 69 back into the surge tank 52. The purpose of the valve 69 is to prevent the mixture from flowing into the remaining portion of the system until the homogenizer 63 has come up to pressure which takes only a very short time at the beginning of the cycle. Once the homogenizer has attained the desired pressure of 2,000 p.s.i., the valve 66 is actuated so that the entire flow from line 64 will pass through the cooler 72 which reduces the temperature of the mixture to, say, 80° F. and then is directed through line 73 and valve 75 into the storage tank 82.

When the storage tank 82 has a predetermined quantity of mixture therein, the valve 74 is operated so that the storage tank 81 will start to fill. While storage tank 81 starts to fill, the fluid in storage tank 82 is tested for fat content by the "Mojonnier" test which takes approximately one-half hour and is extremely accurate in determination, sufficient time being afforded for this test as a greater time is required to fill the storage tank 81.

Based on the results of such test, additional cold skim milk is supplied to storage tank 82 through valve 85, the amount passing through the valve being a predetermined quantity which is mathematically determined to set the fat content of the mixture to the desired amount, say, 18 percent in the illustrative embodiment herein described.

After the skim milk has been added to the mixture in the storage tank 82, as above described, the pump 92 is actuated and valve 91 is opened so that the fluid in tank 82, which is now at the desired 18 percent fat concentration, will flow into the surge tank 96.

This fluid which is at a temperature of say 80° F. is forced by pump 99 through line 100 into the regenerative section 101 of plate heat exchanger unit 102. The fluid is continuously drawn from the regenerative section 102 and forced by pump 105 through line 107 and through the heating section 109 of the unit 102 where its temperature is raised to say 165° F., the pasteurization temperature.

The pump 105 is designed to pass a given volume of fluid per unit time and the heated fluid from the heating unit is forced into the homogenizer unit 114 where it is subjected to a pressure of say 2,500 p.s.i. and then passes through line 116 into an elongated holding tube 117 which provides a sufficiently long path for the fluid passing therethrough at a temperature of 165° F. for complete pasteurization to occur.

The output of the holding tube is connected to inlet port 118 of a flow diversion valve 119 which is temperature controlled. Thus, at the beginning of the cycle or if the temperature of the fluid passing through the valve should fall below the pasteurization temperature of 165° F., the valve will divert the fluid passing therethrough, through outlet port 121 and line 122 back into the surge tank 96 for recirculation.

When the temperature of the fluid flowing through the valve 119 is 165° F. or greater, the valve will direct such fluid through outlet port 123 and line 124, and through the cooling section 126 of the unit 102, where its temperature is reduced to say 72° F. The cooled fluid then flows through line 128 into a storage tank 131, and is tapped off from this tank through valve 135 into agitator tank 143, for example.

The tanks 143 and 144 are of predetermined size and when the tank 143 has filled to capacity with a mixture which has a fat content of say 18 percent and is at a temperature of say 72° F., the valve 135 is actuated to switch the flow from storage tank 131 into agitator tank 144.

The tank 143 is then charged with a predetermined quantity of starter and rennet of conventional type to make sour cream and the resultant mixture, after being stirred by the associated agitator, is drawn from the tank 143 through line 147 into suitable receptacles or cans.

As the tank 143 will empty before the tank 144 is filled, it is apparent that after tank 144 is filled, the flow from the storage tank 131 can then be directed back into tank 143 so that the mixture in tank 144 can be processed as above described.

Thus, there is no stoppage of the continuous processing effected by the equipment until the entire run is completed.

The contents of the cans are cured by being maintained at the temperature of say 72° F. in a suitable heating chamber until such contents have ripened to a desired acidity and thereupon are cooled to a temperature of say 35° F. to stop further souring in order to form the finished product.

With the equipment and method above described, any desired quantity of sour cream can be processed with the use of conventional components.

By reason of the combination of the hot skim milk with the sweet cream, the resultant mixture will be at a temperature that is above that at which butter will be formed and hence the mixture may readily be pumped through the various processing stages.

As the operation is continuous once the cycle has started, no air can be drawn into the mixture as it is being homogenized, thereby providing a uniform smooth product that is devoid of lumps.

As ample time is afforded by the method and system to make accurate fat tests of the fluid in each of the storage tanks 81 and 82, the product can be standardized to the desired fat content with a high degree of accuracy so that the resultant product will be the same, even from day to day.

As many changes could be made in the above method and equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. The method of producing sour cream having a predetermined fat content which comprises the steps of charging a storage tank with a predetermined quantity of skim milk, heating the skim milk until it has attained a desired temperature, liquefying by application of heat, a quantity of a frozen sweet cream having a fat content far in excess of that desired for the sour cream and of a quantity such that when combined with the skim milk will provide a mixture that has a fat content slightly in excess of that desired for the sour cream, adding the contents of the storage tank to the sweet cream as the latter is being liquefied to raise the temperature of the mixture to substantially that of the contents of the storage tank, pumping the mixture of skim milk and sweet cream back into the storage tank and thereupon homogenizing the mixture and standardizing the same to provide a fat content of desired value, pasteurizing and rehomogenizing the standardized mixture, adding starter and rennet thereto, curing the mixture until it has attained a desired acidity and then cooling the mixture.

2. The method set forth in claim 1 in which the contents of the storage tank is continuously circulated out of and back into the storage tank as it is being heated, and a portion of the circulating contents of the storage tank is continuously added to the sweet cream as it is being heated.

3. The method set forth in claim 1 in which the contents of the storage tank is continuously circulated out of and back into the storage tank as it is being heated, a portion of the circulating contents of the storage tank is continuously added to the sweet cream as it is being liquefied and the sweet cream is liquefied in relatively small quantities as the contents of the storage tank is added thereto until all of the desired quantity of sweet cream has been liquefied and the mixture is continuously fed back into the storage tank and recirculated for heating and to be added to the sweet cream as it is being liquefied.

4. The method set forth in claim 1 in which the desired fat content of the sour cream is approximately 18 percent, and the initial mixture of sweet cream and skim milk provides a fat content of approximately 20 percent.

5. The method set forth in claim 1 in which the initial mixture of sweet cream and skim milk is raised to a temperature of more than approximately 120° F. but less than approximately 160° F.

6. The method set forth in claim 1 in which the contents of the storage tank is continuously circulated out of and back into the storage tank as it is being heated, a portion of the circulating contents of the storage tank is continuously added to the sweet cream as it is being liquefied and the sweet cream is liquefied in relatively small quantities as the hot contents of the storage tank is added thereto until all of the desired quantity of sweet cream has been liquefied and the mixture is continuously fed back into the storage tank and recirculated for heating and to be added to the sweet cream as it is being liquefied, a portion of the mixture being fed back directly to be added to the sweet cream to be liquefied and the remaining portion of the mixture being fed back into the storage tank.

7. The method set forth in claim 6 in which, after the entire quantity of sweet cream has been liquefied, the entire mixture is fed back into the storage tank and the addition of the contents of the storage tank to the sweet cream is discontinued and thereupon such mixture is further processed.

8. The method set forth in claim 1 in which the mixture of skim milk and sweet cream is continuously drawn from the storage tank for further processing.

9. The method set forth in claim 1 in which the mixture of skim milk and sweet cream is continuously drawn from the storage tank for further processing and is continuously homogenized, and thereupon the homogenized mixture is collected in a second storage tank and after such storage tank has a predetermined quantity of mixture therein, the continuously flowing mixture is collected in a third storage tank, the mixture in the second storage tank being tested for fat content and standardized while the third storage tank is filling, and thereupon while the third tank is filling the standardized contents of the second storage tank is drawn therefrom for further processing and the second storage tank is emptied and after the third storage tank is charged the contents of the third storage tank is standardized and drawn therefrom for further processing.

10. The method set forth in claim 9 in which the standardized contents of the second and third storage tanks are continuously pasteurized and homogenized and predetermined quantities are successively collected and a quantity of starter and rennet based upon each quantity collected is added thereto.

11. The method set forth in claim 9 in which the standardized contents of the second and third storage tanks are continuously pasteurized and homogenized by a short time method and predetermined quantities are successively and continuously collected and a quantity of starter and rennet based upon each quantity collected, is added thereto.

12. Equipment for continuously producing sour cream having a predetermined fat content comprising a storage tank having an inlet and an outlet, a heater, a pump to circulate the contents of the storage tank from its outlet through the heater back into the inlet, a liquefier having an inlet and an outlet, a surge tank, means connecting the outlet of the liquefier to the surge tank, means connecting the outlet of the storage tank to the surge tank to feed a quantity of fluid thereto, a second pump to draw fluid from the surge tank, means to feed portions of the fluid drawn from the surge tank back into the liquefier and into the inlet of the storage tank, a continuous type homogenizer, means to force the fluid in said storage tank through said homogenizer, a second and third storage tank, means successively to charge each of said second and third storage tanks with fluid from the homogenizer, a short time pasteurizer, means successively to force fluid from the second and third storage tanks through said short time pasteurizer, a short time second homogenizer, means to force said pasteurized fluid through said second homogenizer, a fourth storage tank adapted to be charged with fluid from said second homogenizer, a first and second agitator tank, and means connected to said fourth storage tank successively to charge said agitator tanks with predetermined quantities of fluid.

13. The combination set forth in claim 12 in which the means to feed portions of the fluid drawn from the surge tank back into the liquefier and into the inlet of the storage tank comprises a valve having an inlet port connected to the second pump and a pair of outlet ports connected respectively to the liquefier and the storage tank, said valve having means to apportion the fluid flowing into the inlet ports through the outlet ports.

14. The combination set forth in claim 12 in which a continuous flow heater is provided between the storage tank and the first homogenizer.

15. The combination set forth in claim 12 in which a continuous flow heater is provided between the storage tank and the first homogenizer, and a continuous flow cooler is provided between the first homogenizer and the second and third storage tanks.

16. The combination set forth in claim 12 in which the means successively to charge each of said second and third storage tanks with fluid from the first homogenizer comprises a valve having an inlet port connected to the first homogenizer and a pair of outlet ports connected respectively to the second and third storage tanks and adapted to be respectively alternately connected to the inlet port.

17. The combination set forth in claim 12 in which said short time pasteurizer has a regenerative section and a heating section, said second and third storage tanks being adapted to be respectively alternately connected to the regenerative section, a pump adapted to deliver a given quantity of fluid in a predetermined period connected between the outlet of the regenerative section and the inlet of the heating section, said second homogenizer being connected to the outlet of said heating section.

18. The combination set forth in claim 17 in which said short time pasteurizer has a cooling section and a holding tube is connected between the outlet of said second homogenizer and the inlet of said cooling section, the outlet of said cooling section being connected to said fourth storage tank.

19. The combination set forth in claim 17 in which said short time pasteurizer has a cooling section, a heat responsive valve is provided having an inlet port, a holding tube is connected between the outlet of said second homogenizer and said inlet port, said valve having a pair of outlet ports, one of said ports being connected to the inlet of the cooling section, the outlet of said cooling section being connected to said fourth storage tank, and means connecting the other outlet port to the inlet of said regenerative section whereby when the temperature of the fluid flowing through said valve is below a predetermined amount, the fluid flowing therethrough will be directed to the inlet of the regenerative section of the short time pasteurizer.

References Cited in the file of this patent

UNITED STATES PATENTS

| | | |
|---|---|---|
| 2,717,212 | Hensgen et al. | Sept. 6, 1955 |
| 2,719,793 | Page et al. | Oct. 4, 1955 |
| 2,781,269 | Harper et al. | Feb. 12, 1957 |